US012669343B2

(12) United States Patent
Mayster et al.

(10) Patent No.: US 12,669,343 B2
(45) Date of Patent: Jun. 30, 2026

(54) NAVIGATION-INTEGRATED SCENIC LOCATION VALUE AND ROUTE PLANNING

(71) Applicant: GOOGLE LLC, Mountain View, CA (US)

(72) Inventors: Yan Mayster, Mountain View, CA (US); Tom Weng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/282,963

(22) PCT Filed: Oct. 26, 2022

(86) PCT No.: PCT/US2022/047814
§ 371 (c)(1),
(2) Date: Sep. 19, 2023

(87) PCT Pub. No.: WO2024/091229
PCT Pub. Date: May 2, 2024

(65) Prior Publication Data
US 2025/0076063 A1     Mar. 6, 2025

(51) Int. Cl.
G01C 21/34          (2006.01)
G01C 21/36          (2006.01)
(52) U.S. Cl.
CPC ..... G01C 21/3476 (2013.01); G01C 21/3676 (2013.01)
(58) Field of Classification Search
CPC ................ G01C 21/34; G01C 21/3644; G01C 21/3679; G01C 21/3682; G01C 21/3691; G06F 16/24578
See application file for complete search history.

(56) References Cited

U.S. PATENT DOCUMENTS 9,726,510 B2    8/2017  Peri et al.
9,746,336 B2    8/2017  Rutten et al.
(Continued)

FOREIGN PATENT DOCUMENTS

EP          2 616 775 B1    1/2016
WO     WO-2010/081544 A1    7/2010
WO     WO-2011/095235 A2    8/2011

OTHER PUBLICATIONS

International Search Report and Written Opinion for Application No. PCT/US2022/047814, dated Aug. 21, 2023.
Hotel with view Grand Canyon—Google Search (Sep. 23, 2022).

*Primary Examiner* — Kito R Robinson
*Assistant Examiner* — Erin Marie Hartmann
(74) *Attorney, Agent, or Firm* — Lerner David LLP

(57)          ABSTRACT

To provide navigation directions in response to a request for viewing a particular type of geographical feature on a route to a destination, a computing device receives a request for navigation directions from a starting location to a destination that specifies a particular type of geographical feature for viewing on a route to the destination. The computing device identifies at least one candidate route for navigating to the destination location that includes a road segment from which the particular type of geographical feature can be viewed, and selects a route from the set of candidate routes based at least in part on an extent to which the particular type of geographical feature can be viewed from each candidate route. Then the computing device provides a set of navigation directions for presentation on a client device for navigating to the destination location via the selected route.

17 Claims, 8 Drawing Sheets

(56)        References Cited

U.S. PATENT DOCUMENTS

| | | |
|---|---|---|
| 10,360,228 B1 * | 7/2019 | Katragadda ......... G06F 16/9038 |
| 11,402,223 B1 * | 8/2022 | Grealish-Rust .... G01C 21/3614 |
| 2010/0138146 A1 | 6/2010 | Vogt et al. |
| 2021/0172753 A1 * | 6/2021 | Johnson, Jr. ......... G01C 21/343 |

* cited by examiner

Road Segment 200

Geographical Feature Data

| Segment ID 202 | Location 204 | Landmark Type 206 | Distance to Landmark 208 | Size of Landmark 212 | Landmark Count 214 | Landmark Visibility 216 | Landmark Popularity 218 | Landmark Diversity 222 |
|---|---|---|---|---|---|---|---|---|
| 1 | (x1,y1) | Waterfall | 100 m | 100 m height | 2 | High | High | High |
| 2 | (x2,y2) | Mountain | 200 m | 1 km elevation | 3 | Medium | Medium | Medium |
| 3 | (x3,y3) | Monument | 1000 m | 20 m high | 1 | High | Medium | Medium |

FIG. 2A

POI 250

Geographical Feature Data

| POI Name 252 | POI Type 254 | Landmark Type 256 | Distance to Landmark 258 | Size of Landmark 262 | Landmark Count 264 | Landmark Visibility 266 | Landmark Popularity 268 | Landmark Diversity 272 |
|---|---|---|---|---|---|---|---|---|
| Bob's Inn | Hotel | Bridge | 100 m | 3000 m long, 200 m high | 1 | High | High | Low |
| Jack's Smokehouse | Restaurant | River | 200 m | 1000 km long | 1 | Medium | Low | High |
| John's Lodge | Hotel | Canyon | 1000 m | 500 km² | 4 | Low | Medium | Low |

Route Options

| | | | |
|---|---|---|---|
| Waterfall Views | ☐ | Architectural Views | ☐ |
| Mountain Views | ☐ | Building Views | ☐ |
| Water Views | ☐ | Bridge Views | ☐ |
| Ocean Views | ☐ | Castle Views | ☐ |
| Lake Views | ☐ | Church/Temple Views | ☐ |
| River Views | ☐ | Monument Views | ☐ |
| Greenery Views | ☐ | | |
| Cave Views | ☐ | | |
| Cliff Views | ☐ | | |

NAVIGATION-INTEGRATED SCENIC LOCATION VALUE AND ROUTE PLANNING

FIELD OF THE DISCLOSURE

The present disclosure relates to digital mapping data and, more particularly, to selecting navigation routes having routes with views of particular types of geographical features.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications executing in computers, smartphones, embedded devices, etc., generate step-by-step navigation directions in response to receiving input from a user, specifying the starting point and the destination. The navigation directions are typically generated for a route which guides the user to the destination in the shortest amount of time.

SUMMARY

A geographical feature scoring engine may assign categorical scores to road segments or locations within a geographic area based on an extent to which a particular type of geographical feature can be viewed from the location or road segment. For example, for a particular location, the geographical feature scoring engine may assign a waterfall score, a mountain score, a cliff score, a body of water score, a cave score, a greenery score, an architectural score, etc., based on the extent to which the geographical feature can be viewed from the particular location. Geographical feature types may include natural geographical feature types, such as rock formations, forests, etc., and man-made geographical feature types such as buildings, bridges, monuments, etc. Additionally, a geographical feature type may have subtypes. For example, an architectural geographical feature type may include subtypes such as buildings, bridges, castles, churches, temples, monuments, etc. A body of water geographical feature type may include subtypes such as oceans, lakes, rivers, etc. The geographical feature scoring engine may assign categorical scores to the road segments or locations within a geographic area for each type and/or subtype of geographical feature.

To assign a categorical score to a location, the geographical feature scoring engine may generate several metrics, such as a distance metric indicative of a distance from the location to a nearest landmark having the particular type of geographical feature. For example, if the geographical feature type is bodies of water and the location is on the cast coast of the United States, then the nearest landmark may be the Atlantic Ocean.

The geographical feature scoring engine may also generate a visibility metric indicative of visibility of the landmark from the location. The visibility metric may change based on weather conditions, the time of day, or the time of year. For example, certain landmarks may be more difficult to view in the winter when they are likely to be covered in snow, for example. Other landmarks may be more difficult to view at night than during the day or vice versa. The geographical feature scoring engine may determine the visibility metric based on images captured of the landmark from the location, a 360° viewshed from the location indicating each of the geographical features viewable from the location, a digital terrain map for computing the viewshed, etc.

Additionally, the geographical feature scoring engine may generate a size metric indicative of a size of the landmark. The size metric may be based on the elevation of the landmark, the surface area of the landmark, the height of the landmark, the width of the landmark, the weight of the landmark, the length of the landmark, the volume of the landmark, etc. In some implementations, the size metric may be a visible size metric based on the amount or percentage of the landmark which is visible/unobstructed. The visible size metric may also be based on the portion of the view which faces the location or the road segment.

Moreover, the geographical feature scoring engine may generate a count metric indicative of a number of geographical features at the landmark matching the geographical feature type. For example, if the geographical feature type is waterfalls, the count metric may indicate the number of waterfalls at the landmark. If the geographical feature type is mountains, the count metric may indicate the number of peaks at the landmark.

Still further, the geographical feature scoring engine may generate a popularity metric indicative of the popularity of the landmark. The geographical feature scoring engine may determine the popularity metric based on the size of crowds at the landmark, reviews of the landmark, the amount of money spent at the landmark, etc.

Furthermore, the geographical feature scoring engine may generate a diversity metric indicative of diversity of geographical features at the landmark. The diversity metric may be based on a variation in sizes, shapes, types, or subtypes of geographical features at the landmark. For example, the geographical feature scoring engine may determine the diversity metric based on variations in elevations, variations in heights of buildings or trees, the number of different types of geographical features such as a landmark having rivers and mountains, the number of different subtypes of geographical features such as the number of different species of trees at the landmark, etc.

In any event, the geographical feature scoring engine may aggregate and/or combine the metrics for a particular geographical feature type for a location in any suitable manner to generate the categorical score for the location for the particular geographical feature type. For example, the categorical score may be based on a sum of the metrics, an average of the metrics, a product of the metrics, a weighted sum of the metrics, a weighted average of the metrics, a weighted product of the metrics, etc. Each metric may be assigned a weight based on a level of importance for the metric to the categorical score. As mentioned above, each location may be assigned several different categorical scores each corresponding to a different geographical feature type.

Then the geographical feature scoring engine may provide navigation and/or map data to a user based on the categorical scores. For example, the user may provide a request for a particular type of point of interest (POI) (e.g., hotels, restaurants, etc.) with a view of a particular geographical feature type (e.g., mountains, rivers, waterfalls, etc.). The geographical feature scoring engine may obtain a set of candidate POIs matching the requested type within a particular geographic area. For example, the geographical feature scoring engine may obtain a list of hotels in or near San Francisco. Then the geographical feature scoring engine may rank the set of candidate POIs according to their categorical scores for the particular geographical feature type. The geographical feature scoring engine may select the highest ranking POI and provide it for presentation within a map display on the user's client device. Additionally or alternatively, the geographical feature scoring engine may provide the set of candidate POIs or a subset of the candidate POIs in ranked order for presentation within the map display on the user's client device.

In another example, the user may provide a request for navigation directions from a starting location to a destination. The user may also request to view a particular geographical feature type on the route to the destination. The geographical feature scoring engine may obtain a set of candidate routes to the destination. For each road segment on the candidate routes, the geographical feature scoring engine may obtain the categorical score assigned to the road segment for the requested geographical feature type. The geographical feature scoring engine may then assign an overall score to each road segment based on the categorical score and/or a duration score according to an estimated time period for traversing the road segment. The geographical feature scoring engine may aggregate or combine the overall scores for the road segments in any suitable manner to generate an overall score for each candidate route from the starting location to the destination location.

Then the geographical feature scoring engine ranks the candidate routes according to their overall scores and selects the candidate route having the highest or lowest overall score as the route to provide to the user. In other implementations, the geographical feature scoring engine ranks the candidate routes according to their categorical scores without using the duration score. The geographical feature scoring engine then filters out candidate routes having durations or distances which exceed the shortest duration or distance for traveling to the destination by more than a threshold duration or distance. In these implementations, the geographical feature scoring engine selects the candidate route of the filtered candidate routes having the highest or lowest categorical score as the route to provide to the user. In any event, the geographical feature scoring engine transmits a set of navigation directions for presentation on the client device for navigating from the starting location to the destination location via the selected route.

By assigning categorical scores to locations for particular geographical feature types, the mapping system more accurately routes a user around specific types of landmarks that the user wants to see. The user can not only specify that they want a scenic route to the destination, but that the route should include views of a particular type of geographical feature, such as a mountain, waterfall, cliff, canyon, lake, etc. Additionally, the mapping system not only allows the user to find locations for particular types of landmarks but also POIs which have the best views of the landmarks, such as restaurants, hotels, etc. with views of the landmarks. This improves the mapping system by increasing the functionality of the mapping application.

In particular, an example embodiment of the techniques of the present disclosure is a method for providing navigation directions in response to a request for viewing a particular type of geographical feature on a route to a destination. The method includes receiving a request for navigation directions from a starting location to a destination. The request specifies a particular type of geographical feature for viewing on a route to the destination. The method also includes identifying at least one candidate route of a set of candidate routes for navigating from the starting location to the destination location that includes a road segment from which the particular type of geographical feature can be viewed, and selecting a route from the set of candidate routes based at least in part on an extent to which the particular type of geographical feature can be viewed from each candidate route. The method further includes providing a set of navigation directions for presentation on a client device for navigating from the starting location to the destination location via the selected route.

Another embodiment of these techniques is a computing device for providing navigation directions in response to a request for viewing a particular type of geographical feature on a route to a destination. The computing device includes one or more processors and a computer-readable medium, which is optionally non-transitory, storing instructions thereon. When executed by the one or more processors, the instructions cause the computing device to receive a request for navigation directions from a starting location to a destination. The request specifies a particular type of geographical feature for viewing on a route to the destination. The instructions also cause the computing device to identify at least one candidate route of a set of candidate routes for navigating from the starting location to the destination location that includes a road segment from which the particular type of geographical feature can be viewed, and select a route from the set of candidate routes based at least in part on an extent to which the particular type of geographical feature can be viewed from each candidate route. Further, the instructions cause the computing device to provide a set of navigation directions for presentation on a client device for navigating from the starting location to the destination location via the selected route.

By virtue of the above process, the client device (user) is provided with a set of candidate routes ranked objectively based on criteria set by the user. Specifically, the candidate routes are ranked objectively based on the user-specified particular type of geographical feature, such that routes in which the particular type of geographical feature is most visible/prevalent on the route are ranked more highly than those in which the particular type of geographical feature is less visible or absent. As such, the method provides the user with a ranked set of routes that guarantee and maximize visibility of the user's desired particular type of geographical feature. The user is therefore able to select a route, using their client device, which guarantees a desired landscape. The method may also take the duration of routes into account, thereby balancing the visibility and prevalence of the particular type of geographical feature with the duration of the route. As such, the user can select a route that guarantees visibility of the user's desired particular type of geographical feature, while minimizing the impact on the total route duration.

Yet another embodiment of these techniques is a method for providing a map display in response to a request for viewing a particular type of geographical feature. The method includes receiving a request for a particular type of point of interest (POI) in a geographic area for viewing a particular type of geographical feature from the POI. The particular type of POI is different from the particular type of geographical feature. The method also includes identifying a set of candidate POIs in the geographic area, and selecting a POI from the set of candidate POIs using, for each POI in the set, one or more of: a distance metric indicative of a distance from the POI to a nearest landmark which can be viewed from the POI having the particular type of geographical feature, a visibility metric indicative of visibility of the landmark from the POI, a size metric indicative of a size of the landmark, a count metric indicative of a number of geographical features having the particular type of geographical feature at the landmark, a popularity metric indicative of popularity of the landmark, or a diversity metric indicative of diversity of the geographical features at the landmark. Furthermore, the method includes providing an indication of the selected POI for presentation within a map display on a client device.

By virtue of the above process, the client device (user) is provided with a set of candidate POIs ranked objectively based on criteria set by the user. Specifically, the POIs are ranked objectively based on the user-specified particular type of geographical feature, such that POIs in which the particular type of geographical feature is most visible/prevalent are ranked more highly than those in which the particular type of geographical feature is less visible or absent. As such, the method provides the user with a ranked set of POIs that guarantee and maximize visibility of the user's desired particular type of geographical feature. The user is therefore able to select a POI, using their client device, which guarantees a desired landscape. The method may also take the other metrics into account, such as price and/or quality, thereby balancing the visibility and prevalence of the particular type of geographical feature with the price and/or quality of the POI. As such, the user can select a POI that guarantees visibility of the user's desired particular type of geographical feature, while minimizing the impact on the price and/or quality of the POI.

BRIEF DESCRIPTION OF THE DRAWINGS

FIGS. 2A-2B illustrate example data tables including characteristics of locations and/or characteristics of the landmarks which can be viewed from the locations for assigning categorical scores based on the extent to which a particular type of geographical feature can be viewed from each location;

FIG. 5 illustrates an example route options menu presented in response to receiving a selection of a route options user control on the example navigation display of FIG. 4, where the route options menu includes user controls for selecting a preference for a particular type of geographical feature to view on a route to the destination;

FIG. 6 illustrates an example map display including a set of geographic search results in response to receiving a geographic search query for a particular type of point of interest (POI) in a geographic area which has a view of a particular type of geographical feature;

DETAILED DESCRIPTION

Overview

Figure 1:
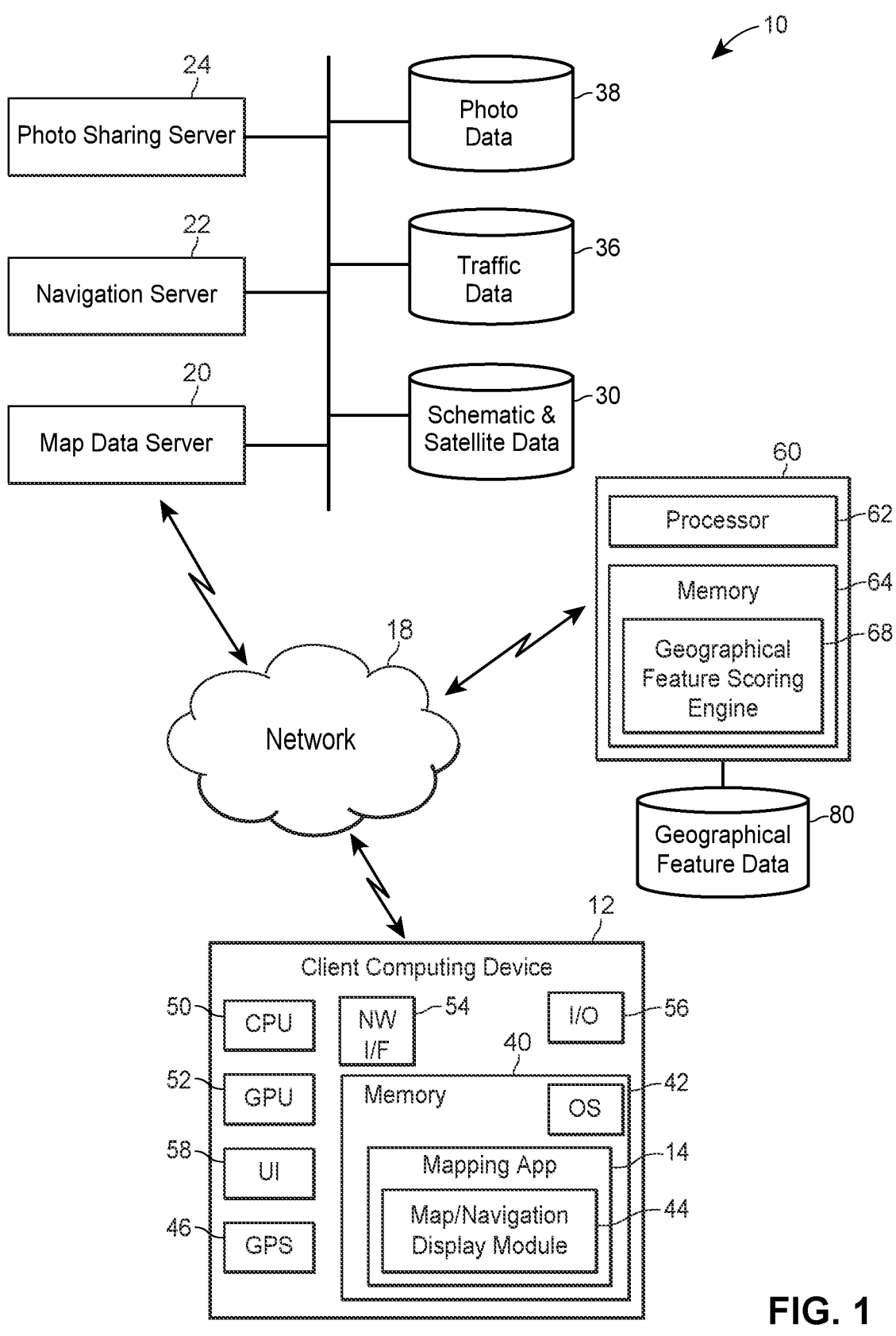
FIG. 1 illustrates a block diagram of an example communication system in which techniques for providing navigation directions or a map display in response to requests for viewing a particular type of geographical feature can be implemented.

Generally speaking, the techniques for providing navigation directions or a map display in response to a request for viewing a particular type of geographical feature can be implemented in one or several client computing devices, one or several network servers or a system that includes a combination of devices. However, for clarity, the examples below focus primarily on an embodiment in which a mapping application executes on a client computing device and includes user controls for selecting a particular type of geographical feature. Geographical feature types may include natural geographical features, such as waterfalls, mountains, cliffs, valleys, deserts, hills, bodies of water, caves, greenery, canyons, etc., and man-made geographical features such as bridges, castles, buildings, churches, temples, monuments, statues, pyramids, dams, reservoirs, etc.

The mapping application may also include a user control for requesting navigation directions from a starting location to a destination location, where the route to the destination includes views of the particular geographical feature type. The client computing device may transmit the request including the starting location, the destination location, user preferences for viewing a particular geographical feature type on the route, etc., to a server device.

The server device may then obtain a set of candidate routes from the starting location to the destination location for example, from a navigation server or may obtain a set of road segments within a geographic area that includes the starting location and the destination location. The server device may assign a categorical score to each of the road segments on the candidate routes and/or within the geographic area for the particular geographical feature type. For example, when the particular geographical feature type is mountains, the server device may assign a mountain score to each of the road segments on the candidate routes and/or within the geographic area.

The server device may generate the categorical score by generating several metrics for the road segment. The server device may generate each metric based on the quality/prominence of a landmark matching the selected geographical feature type which can be viewed from the road segment and/or the quality of the view. For example, the server device may generate a distance metric, a visibility metric, a size metric, a count metric, a popularity metric, a diversity metric, etc., for the road segment/landmark and combine the metrics in any suitable manner to generate the categorical score for the selected geographical feature type for the road segment.

The server device may generate these metrics using map feature data from a map data server, from a photo sharing server indicating locations of viewpoints for photographs, from blogs, search results, etc. In addition to assigning a categorical score for each road segment corresponding to the selected geographical feature type, the server device may assign a duration score for each road segment based on the estimated time period for traversing the road segment. The server device may then combine the categorical score for the road segment with the duration score for the road segment in any suitable manner to generate an overall score for the road segment. Then the server device may aggregate or combine the overall scores for the road segments in any suitable manner to generate an overall score for a candidate route from the starting location to the destination location.

The server device then ranks the candidate routes according to their overall scores and selects the candidate route having the highest or lowest overall score as the route to provide to the user. Then the server device transmits a set of navigation directions for presentation on the client computing device for navigating from the starting location to the destination location via the selected route.

Example Hardware and Software Components

Referring to FIG. 1, an example communication system 10 in which a geographical feature scoring system can be implemented includes a client computing device 12 (also referred to herein as a "client device") configured to execute a geographic application 14, which also can be referred to as "mapping application 14." Depending on the implementation, the mapping application 14 can display an interactive digital map, request and receive routing data to provide driving, walking, or other navigation directions, provide tours of geographic areas, provide various geolocated content, etc. The client device 12 may be operated by a user displaying a digital map while navigating to various locations.

In addition to the client device 12, the communication system 10 includes a server device 60 configured to provide a selected route for navigating from a starting location to a destination location to the client device 12, where the route is selected based at least in part on the quality of the views of a selected geographical feature type for the road segments along the route. The server device 60 can be communicatively coupled to a database 80 that stores, in an example implementation, geographical feature data for various landmarks, visibility data for viewing the landmarks from particular locations/road segments, etc. For example, the data may include the location of a road segment, the length of the road segment, distances from the road segment to various types of landmarks, sizes of each landmark, a visibility metric indicative of visibility of each landmark from the road segment, a popularity metric indicative of popularity of the landmark, a diversity metric indicative of the amount of diversity at the landmark, etc.

More generally, the server device 60 can communicate with one or several databases that store any type of suitable geospatial information. The communication system 10 also can include a navigation data server 22 that provides driving, walking, biking, or public transit directions, for example for presentation via the navigation application 14. Further, the communication system 10 can include a map data server 20 that provides map data including map features data for road segments or for locations corresponding to the road segments. The devices operating in the communication system 10 can be interconnected via a communication network 18.

The map data server 20 and navigation server 22 are coupled to a map database 30 which includes schematic and satellite data storing street and road information, topographic data, satellite imagery, etc. The servers 20, 22 are also coupled to a traffic database 36 which includes current traffic conditions, and also may include road closure data, estimated time data, etc. Furthermore, a photo sharing server 24 is coupled to a photo database 38 which stores photographs captured from various locations and at various times. The photo database 38 may store the photographs along with indications of when and where they were captured. In general, the navigation server 22 can receive information related to geographic locations from any number of suitable databases, web services, etc. One or more operators can periodically update the databases 30, 36, and 38 where each operator provides updates to the databases 30, 36, and 38 at respective time intervals. For example, the traffic and photo databases 36 and 38 may store substantially real-time data, whereas the schematic and satellite database 30 may be updated relatively infrequently, such as once a week.

The schematic and satellite database 30 can store data in a raster format, a vector format, in any other suitable format or any combination thereof. In some implementations, the data is organized into map tiles at multiple zoom levels to facilitate serving map data to client devices. The schematic and satellite database 30 may also store three-dimensional map data such as street level views of the surroundings from various locations. The three-dimensional map data may be captured using specialized equipment such as a high-resolution camera with a wide-angle lens or fish eye lens and/or image sensors such as LIDAR (Light Detection and Ranging) sensors to detect depth. Several photographs of geolocated imagery captured by the camera or by several cameras having narrow lenses may then be stitched together to generate the three-dimensional map data. The three-dimensional map data may be rendered onto a surface of a virtual cylinder to simulate the feeling that a user is in the middle of a scene, such as a rectangular cross-section of the virtual cylinder or onto any other surface of a three-dimensional solid centered around the perspective of the user. In another example, the three-dimensional map data may include a three-dimensional rendering of real-world buildings, trees, signs, and other objects located within the geographic area. Furthermore, the three-dimensional map data may include any combination of photographs projected onto a virtual cylinder and three-dimensional renderings of real-world objects located within the geographic area. The views may be displayed from the viewpoint of a virtual camera.

Depending on the implementation, the navigation server 22 can provide map and directions data to client devices separately or together in map tiles, for example. In other embodiments, the map data and navigation directions may be generated remotely on remote servers separate from the map data server 20 and navigation server 22. Moreover, in some embodiments, the map and navigation directions may be generated by a combination of the map data server 20, the navigation server 22, and any number of additional servers.

In some implementations, the server device 60 receives map and directions data from the map data server 20 and/or the navigation server 22 including a set of candidate routes each including a set of road segments for navigating from the starting location to the destination location. The server device 60 then analyzes each candidate route in the set of candidate routes based on the estimated time periods for traversing each road segment in the candidate route (e.g., according to the amount of traffic on each road segment), the categorical score for each road segment, etc. In other implementations, the server device 60 communicates directly with the schematic and satellite database 30, and the traffic database 36 to generate a set of candidate routes from the starting location to the destination location and then selects a route from the set of candidate routes to provide to the user for navigating to the destination location.

The client device 12 may be a portable device such as smart phone or a tablet computer, for example. The client device 12 may also be a laptop computer, a desktop computer, a personal digital assistant (PDA), a wearable device such as a smart watch or smart glasses, a virtual reality (VR) headset, etc. The client device 12 also can communicate with various content providers, servers, etc. via a wired or wireless communication network 18 such as a fourth- or third-generation cellular network (4G or 3G, respectively). The client device 12 may include a memory 40, one or more processors (CPUs) 50, a graphics processing unit (GPU) 52, a network interface unit 54, an I/O module 56, a user interface (UI) 58 for displaying map data and directions, and a global positioning system (GPS) 46 or another suitable positioning module. The memory 40 can be a non-transitory memory and can include one or several suitable memory modules, such as random access memory (RAM), read-only memory (ROM), flash memory, other types of persistent memory, etc. The I/O module 56 may be a touch screen, for example. In various implementations, the client device 12 can include fewer components than illustrated in FIG. 1 or conversely, additional components.

The memory 40 stores an operating system (OS) 42, which can be any type of suitable mobile or general-purpose operating system. The memory 40 also stores a mapping application 14 which is configured to generate interactive digital maps and/or perform other geographic functions, as indicated above. The mapping application 14 can receive map data in a raster (e.g., bitmap) or non-raster (e.g., vector graphics) format from the map data server 20 and present the map data via the map/navigation display module 44. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The mapping application 14 also can display driving, walking, or transit directions, and in general provide functions related to geography, geolocation, navigation, etc. via the map/navigation display module 44. Additionally, the mapping application 14 can display POIs having a view of a particular geographical feature type, such as hotels with a view of a nearby cliff. The mapping application 14 can also include user controls for selecting user preferences such as a preference for routes having a view of a particular geographical feature type rather than the fastest routes.

The map/navigation display module 44 in the mapping application 14 is configured to transmit a request for navigation directions from a starting location to a destination location, receive a set of navigation directions for navigating along a route to the destination location, and present the set of navigation directions on the user interface 58. The map/navigation display module 44 in the mapping application 14 is also configured to transmit a request for a particular type of POI for viewing a particular type of geographical feature, receive an indication of a POI matching the request, and present an indication of the POI on the user interface 58.

It is noted that although FIG. 1 illustrates the mapping application 14 as a standalone application, the functionality of the mapping application 14 also can be provided in the form of an online service accessible via a web browser executing on the client device 12, as a plug-in or extension for another software application executing on the client device 12, etc. The mapping application 14 generally can be provided in different versions for different respective operating systems. For example, the maker of the client device 12 can provide a Software Development Kit (SDK) including the mapping application 14 for the Android™ platform, another SDK for the iOS™ platform, etc.

In some implementations, the server device 60 includes one or more processors 62 and a memory 64. The memory

64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a geographical feature scoring engine 68, which can generate a route for navigating from a starting location to a destination location based at least in part on the quality of the views of a selected geographical feature type for the road segments along the route. The geographical feature scoring engine 68 can also generate a set of routes each for navigating from the starting location to the destination location and rank the set of routes according to the quality of the views of a selected geographical feature type for the road segments on each route and/or the estimated time periods for traversing each road segment. Additionally, the geographical feature scoring engine 68 may provide an indication of the route or the set of routes in a ranked order for display by the map/navigation display module 44 of the client device 12.

The geographical feature scoring engine 68 and the map/navigation display module 44 can operate as components of a geographical feature scoring system. Alternatively, the geographical feature scoring system can include only server-side components and simply provide the map/navigation display module 44 with instructions to display the set(s) of navigation directions for traveling from the starting location to the destination location along the route(s) or POI(s) with a view of the selected geographical feature type. In other words, geographical feature scoring techniques in these embodiments can be implemented transparently to the map/navigation display module 44. As another alternative, the entire functionality of the geographical feature scoring engine 68 can be implemented in the map/navigation display module 44.

For simplicity, FIG. 1 illustrates the server device 60 as only one instance of a server device. However, the server device 60 according to some implementations includes a group of one or more server devices, each equipped with one or more processors and capable of operating independently of the other server devices. Server devices operating in such a group can process requests from the client device 12 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the map/navigation display module 44 operating in the client device 12 receives and transmits data to the server data 60. Thus, in one example, the client device 12 may transmit a communication to the geographical feature scoring engine 68 (implemented in the server device 60) requesting navigation directions from a starting location to a destination location. The request may include an indication of a particular geographical feature type.

Accordingly, the geographical feature scoring engine 68 may obtain indications of road segments for a geographic area that includes the starting location and the destination location. Then the geographical feature scoring engine 68 may generate a categorical score for each road segment corresponding to the particular geographical feature type. For example, if the particular geographical feature type is a mountain, the geographical feature scoring engine 68 may generate a mountain score for each road segment. If the particular geographical feature type is a river, the geographical feature scoring engine 68 may generate a river score for each road segment.

The geographical feature scoring engine 68 generates the categorical score for a road segment by identifying characteristics of the road segment/landmark matching the selected geographical feature type and generating metrics based on each characteristic, such as a distance metric, a visibility metric, a size metric, a count metric, a popularity metric, a diversity metric, etc. The geographical feature scoring engine 68 may obtain characteristic information from a map data server 20 that stores map feature data, from a photo sharing server indicating locations of viewpoints for photographs, from blogs, search results, etc.

In some implementations, the geographical feature scoring engine 68 stores the characteristics and/or the categorical scores in the database 80 for retrieval when a user requests navigation directions or POIs.

In addition to assigning categorical scores for road segments within the geographic area that includes the starting and destination locations, the geographical feature scoring engine 68 identifies a set of candidate routes for navigating from the starting location to the destination location. The candidate routes may include several road segments, and the geographical feature scoring engine 68 may obtain an estimated time period for traversing each candidate route and/or each road segment on each candidate route. For example, the geographical feature scoring engine 68 may obtain a set of candidate routes and estimated time periods for traversing the candidate routes from the navigation server 22, from the schematic and satellite database 30, and/or from the traffic database 36.

For each candidate route, the geographical feature scoring engine 68 obtains or generates the categorical scores for the road segments within the candidate route. Then the geographical feature scoring engine 68 assigns an overall score to each road segment based on the categorical score for the road segment and the estimated time period for traversing the road segment.

The geographical feature scoring engine 68 may assign a duration score to the road segment based on the estimated time period for traversing the road segment. The duration score may be proportional to the estimated time period for traversing the road segment, such that shorter estimated time periods have lower scores. The geographical feature scoring engine 68 may then aggregate or combine the scores for the road segment in any suitable manner to generate an overall score for the road segment. The geographical feature scoring engine 68 may also aggregate or combine the overall scores for the road segments in any suitable manner to generate an overall score for the candidate route.

The geographical feature scoring engine 68 may then rank the candidate routes according to their overall scores and select the candidate route having the highest or lowest overall score as the route to provide to the user. The geographical feature scoring engine 68 then transmits a set of navigation directions for presentation on the client device 12 for navigating from the starting location to the destination location via the selected route.

In other implementations, the geographical feature scoring engine 68 provides indications of each of the candidate routes to the client device 12 in a ranked order according to the respective overall scores. In this manner, the user may select one of the candidate routes for navigating to the destination location.

The geographical feature scoring engine 68 may also assign categorical scores for candidate POIs within a geographic area having views of a requested type of geographical feature and corresponding to a requested POI type. The geographical feature scoring engine 68 may then rank the candidate POIs according to their categorical scores and select the candidate POI having the highest overall score as the POI to provide to the user. The geographical feature scoring engine 68 then transmits an indication of the POI for presentation on the client device 12.

In other implementations, the geographical feature scoring engine 68 provides indications of each of the candidate POIs to the client device 12 in a ranked order according to the respective categorical scores. In this manner, the user may select one of the candidate POIs knowing that they are ranked based at least in part on the quality of the view of a particular geographical feature type.

Example Data for Categorically Scoring Road
Segments/POIs by Geographical Feature Type FIGS. 2A and 2B illustrate example data 200, 250 including characteristics 206-222, 256-272 of locations and/or characteristics of the landmarks which can be viewed from the locations. The example data 200, 250 may be stored in the database 80 for example. The geographical feature scoring engine 68 uses the characteristics to generate metrics for a road segment or POI based on each characteristic, and to assign a categorical score to the road segment or POI by aggregating or combining the metrics.

The data table 200 as shown in FIG. 2A includes characteristics of road segments for generating categorical scores for the road segments, while the data table 250 as shown in FIG. 2B includes characteristics of POIs for generating categorical scores for the POIs. As mentioned above, a particular POI or road segment may include multiple categorical scores each corresponding to a different geographical feature type. For example, the geographical feature scoring engine 68 may assign a first categorical score to a road segment, such as a mountain score based on the quality of the view of a mountain from the road segment and/or the quality/prominence of the mountain. The geographical feature scoring engine 68 may also assign a second categorical score to the same road segment, such as a river score based on the quality of the view of a river from the road segment and/or the quality/prominence of the river.

The data 200 shown in FIG. 2A includes geographical feature data for road segments. The data 200 includes rows and columns of metadata types and associated metadata values for each road segment. The data 200 may include an indication of each road segment, such as a unique identifier 202 for the road segment. For example, the United States may include 400,000 road segments, where each road segment is assigned a different road segment ID 202. The indication of the road segment may also include the location 204 of the road segment. The location 204 may be an intersection, street address, stretch of road (e.g., US 101 from mile marker 410 to mile marker 415, Main Street between State Street and North Street), or any other suitable location.

Additionally, the data 200 may include characteristics of each road segment including geographical feature data. The characteristics may include a landmark type 206 of a landmark within a 360° viewshed from the road segment. When a road segment includes multiple landmark types 206 within its viewshed, the data table 200 may include multiple entries or rows for each of the landmark types 206. Then the geographical feature scoring engine 68 assigns multiple categorical scores to the road segment corresponding to each of the landmark types 206 within its viewshed.

Landmark or geographical feature types 206 may include natural geographical features such as waterfalls, mountains, cliffs, valleys, deserts, hills, bodies of water, caves, greenery, canyons, etc., and man-made geographical features such as bridges, castles, buildings, churches, temples, monuments, statues, pyramids, dams, reservoirs, etc. The landmark or geographical feature types 206 may also include subtypes. For example, a body of water may be a landmark or geographical feature type, while a river, lake, ocean, stream, pond, etc., may be subtypes of the body of water type. In another example, architecture may be a landmark or geographical feature type, while buildings, homes, theatres, concert halls, opera houses, stadiums, bridges, aqueducts, castles, etc., may be subtypes of the architecture type.

The geographical feature scoring engine 68 assigns types and/or subtypes of each geographical feature within the viewshed of a road segment. By assigning types and/or subtypes of each geographical feature, the geographical feature scoring engine 68 can assign a categorical score to a road segment for a more general type of geographical feature (e.g., a body of water) or a more specific subtype (e.g., a river) depending on the type or subtype specified in the user's request. In some implementations, when a road segment has views of multiple subtypes within the same type of geographical feature, and the user requests to view the type of geographical feature on the route without specifying a particular subtype, the geographical feature scoring engine 68 may average the categorical scores for each of the subtypes for the road segment corresponding to the requested geographical feature type. In other implementations, the geographical feature scoring engine 68 may combine the categorical scores for each of the subtypes for the road segment in any suitable manner to generate a categorical score for the request geographical feature type. For example, if the user requests navigation directions to a destination with a preference to view bodies of water on the route, and a road segment has views of both a river and a lake, the geographical feature scoring engine 68 may generate a body of water score for the road segment by aggregating river and lake scores for the road segment, averaging the river and lake scores, or combining the river and lake scores in any suitable manner.

The characteristics of each road segment may also include a distance 208 from the road segment to the landmark within the viewshed having the landmark type 206, the size 212 of the landmark, a count 214 of the number of geographical features at the landmark, a visibility metric 216 for landmark, a popularity metric 218 for the landmark, and a diversity metric 222 for the landmark. The geographical feature scoring engine 68 may generate the distance metric, the size metric, and the count metric based on the distance 208, size 212, and count 214 characteristics, respectively.

In some implementations, the geographical feature scoring engine 68 may identify landmarks within the viewshed of the road segment from map data included in the map database 30, from a landmark database that stores indications of landmarks and their corresponding locations, and/or from a viewshed database that stores a set of locations visible from each road segment. Then the geographical feature scoring engine 68 may determine distances from the landmarks to the road segment and identify the landmarks with the viewshed of the road segment. Landmarks may also be identified from reviews, blogs, search results, photo sharing platforms, etc., that include content related to a geographic area that includes the road segment. In some implementations, the geographical feature scoring engine 68 obtains data for a landmark which is referred to in the reviews, blogs, search results, photo sharing platforms, etc., with reference to the road segment or a location corresponding to the road segment.

The size 212 of the landmark may be the elevation of the landmark, the surface area of the landmark, the height of the landmark, the width of the landmark, the weight of the landmark, the length of the landmark, the volume of the landmark, the depth of the landmark, or any other suitable measure of the size of the landmark.

The landmark count 214 may indicate the number of geographical features corresponding to the landmark type 206. For example, if the landmark type 206 is a mountain, the landmark count 214 may indicate the number of mountain peaks visible from the road segment. If the landmark type 206 is waterfalls, the landmark count 214 may indicate that number of waterfalls visible from the road segment. In another example, if the landmark type 206 is buildings, the landmark count 214 may indicate the total number of buildings visible from the road segment or the number of buildings visible from the road segment having heights above a threshold height (e.g., the number of buildings taller than 40 stories).

The visibility metric 216 may be a score for example from 1 to 10, may be a category selected from a set of categories such as visible, not visible, very visible, slightly visible, moderately visible, etc., or may be any suitable metric of the visibility of the landmark(s) from the road segment. The geographical feature scoring engine 68 may generate the visibility metric 216 for a landmark from the road segment by analyzing imagery from the map database 30 such as street level views of the landmark from a viewpoint corresponding to the location of the road segment. The geographical feature scoring engine 68 may analyze the imagery using computational geometry, such as ray tracing to identify obstacles between the road segment and the landmark to determine whether the view of the landmark from the road segment is obstructed. Then the geographical feature scoring engine may determine the visibility metric based on an amount in which the view of the landmark is obstructed from the road segment according to the analysis.

In other implementations, the geographical feature scoring engine 68 may obtain indications of the visibility of the landmark from the road segment or from a location corresponding to the road segment from reviews, blogs, search results, photo sharing platforms, etc. For example, a review may indicate that the view of a particular landmark is obstructed from a road segment. In another example, the geographical feature scoring engine 68 may obtain photographs of the landmark for example, from a photo sharing platform.

For each photograph, the geographical feature scoring engine 68 may obtain an indication of the location of the user who took the photograph as well as comments and reviews of the photograph. Then the geographical feature scoring engine 68 may generate the visibility metric 216 based on the frequency in which photographs of the landmark were captured from the location corresponding to the road segment.

In other implementations, the geographical feature scoring engine 68 may generate the visibility metric 216 based on the reviews and/or comments for photographs of the landmark captured from the location corresponding to the road segment, or based on an analysis of the view of the landmark from the photographs captured from the location corresponding to the road segment. For example, the geographical feature scoring engine 68 may increase the visibility metric in response to obtaining photographs of the landmark captured from the location corresponding to the road segment with reviews and comments which commend the quality of the view. In another example, the geographical feature scoring engine 68 may decrease the visibility metric in response to obtaining photographs of the landmark captured from the location corresponding to the road segment, where the view is obstructed based on an analysis of the photograph.

In yet other implementations, the geographical feature scoring engine 68 may generate the visibility metric 216 based on any suitable combination of analyzing imagery from the map database 30 using computational geometry, and obtaining indications of the visibility of the landmark from reviews, blogs, search results, photo sharing platforms, etc.

In some implementations, the geographical feature scoring engine 68 may adjust the visibility metric 216 based on the date and/or time of the user's request and/or the weather conditions at the road segment. For example, certain landmarks may be more difficult to view in the winter when they are likely to be covered in snow, for example. Other landmarks may be more difficult to view at night than during the day or vice versa.

More specifically, the geographical feature scoring engine 68 may include a day visibility metric for the road segment and a night visibility metric for the road segment. Then depending on the time of day and/or time of year of the user's request, the geographical feature scoring engine 68 may determine whether it is likely to be light or dark at the road segment and may select the day visibility metric or the night visibility metric for the road segment accordingly. For example, in the case that the night visibility metric is selected for the road segment, the geographical features scoring engine 68 may downgrade the landmark visibility metric 216 or 266 one or more tiers, such as from "high" to "medium" or "high" to "low".

The geographical feature scoring engine 68 may also include different visibility metrics for the road segment for different weather conditions and may select the visibility metric matching the current weather conditions at the road segment. For example, the geographical feature scoring engine 68 may include a weather visibility metric for the road segment based on the current weather conditions at the road segment. For example, if it is snowing, the geographical feature scoring engine 68 may select a snow visibility metric. On the other hand, if the weather conditions are sunny, the geographic feature scoring engine 68 may select a sunny visibility metric. By altering the visibility metric 216 or 266 based on selection of a weather visibility metric, a day visibility metric, or a night visibility metric, the geographical feature scoring engine 68 may more accurately determine the actual visibility of the respective landmark type 206 or 256 based on the time of day and/or weather.

The popularity metric 218 may be a score for example from 1 to 10, may be a category selected from a set of categories such as popular, not popular, very popular, slightly popular, moderately popular, etc., or may be any suitable metric of the popularity of the landmark(s). The geographical feature scoring engine 68 may generate the popularity metric 218 for a landmark by obtaining indications of the popularity of the landmark from reviews, blogs, search results, photo sharing platforms, etc. The geographical feature scoring engine 68 may also generate the popularity metric 218 for the landmark by obtaining indications of the size of crowds at the landmark, the amount of money spent at the landmark, etc. For example, the geographical feature scoring engine 68 may provide a query to a search engine for places to visit within the vicinity of the road segment. The popularity metric 218 for landmarks included in the top-ranked search results may be higher than landmarks which are not included in the top-ranked search results or not included in the search results at all.

In some implementations, the geographical feature scoring engine 68 may adjust the popularity metric 218 based on the date and/or time of the user's request and/or the weather conditions at the road segment. For example, some landmarks may be more popular during a particular time of year (e.g., a Christmas lights display, a Fourth of July celebration, etc.) or time of day (e.g., sunset over a mountain range).

The diversity metric 222 may be a score for example from 1 to 10, may be a category selected from a set of categories such as diverse, not diverse, very diverse, slightly diverse, moderately diverse, etc., or may be any suitable metric of the diversity of the landmark. The diversity metric 222 may be based on a variation in sizes, shapes, types, or subtypes of geographical features at the landmark. For example, the geographical feature scoring engine 68 may determine the diversity metric 222 based on variations in elevations, variations in heights of buildings or trees, the number of different types of geographical features such as a landmark having rivers and mountains, the number of different subtypes of geographical features such as the number of different species of trees at the landmark, etc.

Turning now to the data table 250 as shown in FIG. 2B, the data 250 includes geographical feature data for POIs. The data 250 includes rows and columns of metadata types and associated metadata values for each POI. The data 250 may include an indication of each POI, such as a unique identifier for a POI, a name of the POI 252, a location of the POI, etc. Additionally, the data 250 includes a POI type 254 for each POI. POI types 254 may include hotels, restaurants, bars, coffee shops, shopping centers, parking lots, parks, museums, gyms, or any other suitable type of point of interest from which a geographical feature may be viewed. Each POI type 254 is different from its corresponding landmark type 256 which can be viewed from the POI 254. Similar to the data 200, the data 250 includes characteristics of each POI including geographical feature data. The characteristics of each POI may include a distance 258 from the POI to a landmark within the viewshed of the POI having the landmark type 256, the size 262 of the landmark, a count 264 of the number of geographical features at the landmark, a visibility metric 266 for landmark, a popularity metric 268 for the landmark, and a diversity metric 272 for the landmark. The characteristics of a POI may be determined in a similar manner as the characteristics of a road segment.

In any event, the geographical feature scoring engine 68 determines categorical scores for road segments and POIs using the characteristics from the data tables 200, 250. Then the geographical feature scoring engine 68 ranks candidate routes or candidate POIs based on the categorical scores assigned to the candidate routes or candidate POIs to select a route(s) or POI(s) to provide to the user.

To select a route for navigating from the starting location to a destination location, the geographical feature scoring engine 68 may receive a set of candidate routes from the navigation server 22, where each of the candidate routes may be used to navigate from the starting location to the destination location. In addition to receiving the set of candidate routes, the geographical feature scoring engine 68 obtains indications of road segments within a geographic area that includes the starting location and the destination location, assigns a categorical score for each road segment, and obtains an estimated time period for traversing the road segment based on the length of the road segment and/or current traffic data.

The geographical feature scoring engine 68 may then assign an overall score or metric to each road segment based on the categorical score for the requested geographical feature type and/or the estimated time period for traversing the road segment. For example, for a particular road segment the geographical feature scoring engine 68 may aggregate or combine a duration score for the road segment based on the estimated time period for traversing the road segment, and a categorical score for the road segment in any suitable manner to generate the overall score for the road segment. In some implementations, the overall score may be inversely related to the categorical score, such that higher categorical scores produce lower overall scores. In this manner, the geographical feature scoring engine 68 may select road segments having lower overall scores over road segments having higher overall scores.

Then the geographical feature scoring engine 68 may select a route for navigating from the starting location to the destination location using a pathfinding algorithm, where each road segment is assigned a weight corresponding to the overall score for the road segment. In some implementations, the geographical feature scoring engine 68 traverses each path or candidate route from the starting location to the destination location using the road segments in the geographic area and their corresponding weights to identify a path or route having the lowest combined weight. In other implementations, the geographical feature scoring engine 68 traverses each path or candidate route from the starting location to the destination location using the road segments in the geographic area and their corresponding weights to identify a threshold number of paths or routes (e.g., five) having the lowest combined weights for presenting the identified routes in a ranked order according to the combined weights. In yet other implementations, the geographical feature scoring engine 68 obtains a set of candidate routes from the navigation server 22. The geographical feature scoring engine 68 then traverses each candidate route from the starting location to the destination location using the road segments on the candidate route and their corresponding weights to identify a route of the set of candidate routes having the lowest combined weight.

For example, beginning at the starting location each of the road segments in the geographic area are included in a set of candidate road segments. The geographical feature scoring engine 68 may identify a road segment having the lowest weight (e.g., having the lowest overall score) which is connected to the starting location and may remove the identified road segment from the set. Next, the geographical feature scoring engine 68 identifies a road segment remaining in the set having the lowest weight which is connected to the previously identified road segment and removes the identified road segment from the set. This process is repeated until the destination location is reached. When the destination location is reached, the geographical feature scoring engine 68 identifies the set of identified road segments as a candidate route.

This process is then repeated for road segments which were not selected in the first iteration. In a second iteration, the geographical feature scoring engine 68 identifies a second candidate route including a second set of road segments for traversing from the starting location to the destination location. After the geographical feature scoring engine 68 has selected each of the road segments the process is completed. The geographical feature scoring engine 68 then compares the candidate routes and selects the candidate route having the lowest combined weight as the route.

Figure 3:
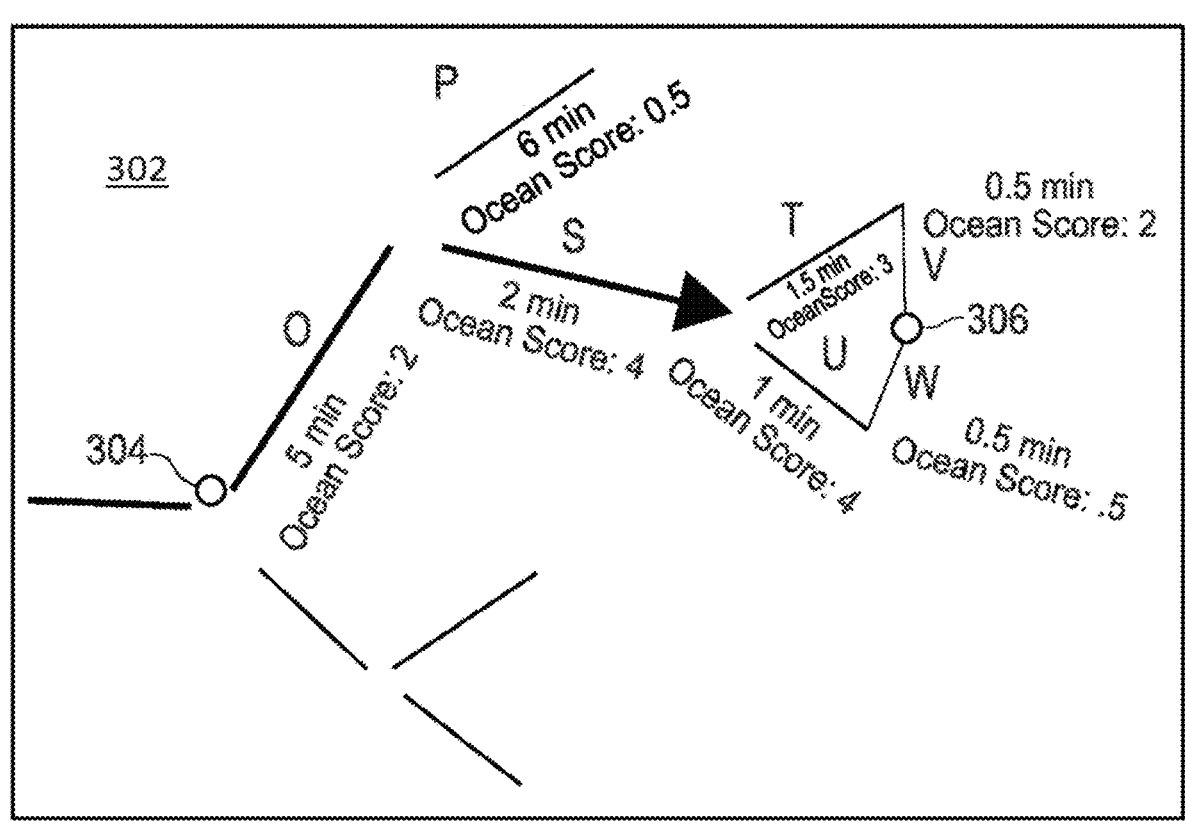
FIG. 3 illustrates an example graph for selecting a navigation route to the destination location using a least-cost path analysis based on estimated time periods for traversing road segments and categorical scores for the road segments.

FIG. 3 illustrates an example display 300 of a geographic area 302 including the starting location 304 and the destination location 306 and having road segments O, P, S, T, U, V, and W. The geographical feature scoring engine 68 may analyze the road segments to identify one or more routes from the starting location 304 to the destination location 306. Each road segment is assigned a weight corresponding to the overall score for the road segment. The overall score may be based on any suitable combination of the estimated time period for traversing the road segment and a categorical score corresponding to the requested geographical feature type for the road segment.

For example, road segment O may have a weight of 2.5 corresponding to an overall score of 2.5 based on an estimated time period for traversing road segment O of 5 minutes and an ocean score of 2. Road segment P may have a weight of 12 corresponding to an overall score of 12 based on an estimated time period for traversing road segment P of 6 minutes and an ocean score of 0.5 where there is little to no view of the ocean. Road segment S may have a weight of 0.5 corresponding to an overall score of 0.5 based on an estimated time period for traversing road segment S of 2 minutes and an ocean score of 4. Road segment T has a weight of 0.5 corresponding to an overall score of 0.5 based on an estimated time period for traversing road segment T of 1.5 minutes and an ocean score of 3. Road segment U has a weight of 0.25 based on an estimated time period for traversing road segment U of 1 minute and a ocean score of 4. Road segments V and W have weights of 0.25 and 1 respectively, corresponding to overall scores of 0.25 and 1 based on estimated time periods for traversing road segments V and W of 0.5 minutes and ocean scores of 2 and 0.5, respectively.

Accordingly, the geographical feature scoring engine 68 may determine that the combined weight is the lowest for a candidate route including road segments O, S, T, and V. The combined weight for the candidate route including road segments O, S, T, and V is 3.75 while the combined weight for the candidate route including road segments O, S, U, and W is 4.25. This is the case even though the combined estimated time period for traversing road segments O, S, T, and V is higher (9 minutes) than the combined estimated time period for traversing road segments O, S, U and W (8.5 minutes), because the ocean score for road segment T decreases the overall score for road segment T.

While the example road segments O, P, S, T, U, V, and W in the example display 300 have weights based on estimated time periods for traversing the road segments and categorical ocean scores, this is merely one example for case of illustration only. The weights for each road segment may also be based on any other suitable metric for the road segment.

In other implementations, the geographical feature scoring engine 68 assigns weights to the road segments corresponding to the categorical scores for the requested geographical feature type without factoring in the durations of each road segment. Then when the geographical feature scoring engine 68 selects a route based on the categorical score weights (e.g., the route having the highest combined categorical scores), the geographical feature scoring engine 68 determines the estimated time period for traversing the selected route. The geographical feature scoring engine 68 compares the estimated time period for traversing the selected route to an estimated time period for traversing the fastest route to the destination. If the estimated time period for traversing the selected route exceeds the estimated time period for traversing the fastest route by more than a threshold duration (e.g., by more than 20%, by more than an hour, etc.), the geographical feature scoring engine 68 selects a different route which does not exceed the estimated time period for traversing the fastest route by more than the threshold duration. In other implementations, if the distance for traversing the selected route exceeds the distance for traversing the shortest route by more than a threshold distance (e.g., by more than 20%, by more than 10 miles, etc.), the geographical feature scoring engine 68 selects a different route having a distance which does not exceed the distance for traversing the shortest route by more than the threshold distance.

In any event, after selecting a route from the set of candidate routes having the highest or lowest combined weight or selecting a threshold number of routes from the set of candidate routes having the highest or lowest combined weights, the geographical feature scoring engine 68 may provide a set of navigation directions for traveling from the starting location to the destination location along the selected route to the client device 12.

Moreover, the geographical feature scoring engine 68 may provide alternative sets of navigation directions for traveling from the starting location to the destination location along alternative routes to the client device 12, where one alternative route may be the fastest route from the starting location to the destination location, another alternative route may be the route having the best view of the requested geographical feature type from the starting location to the destination location according to the categorical scores, and yet another alternative route may be selected based on a combination of the estimated time periods for traversing the road segments and the categorical scores for the road segments, as described above. The user may select a user control on the client device 12 indicating a preference for the fastest route or for views of a particular geographical feature type or subtype. The map/navigation display module 44 may then present a navigation display on the client device 12 with indications of multiple sets of navigation directions for travelling along different routes from the starting location to the destination location for the user to choose from via user controls.

Figure 4:
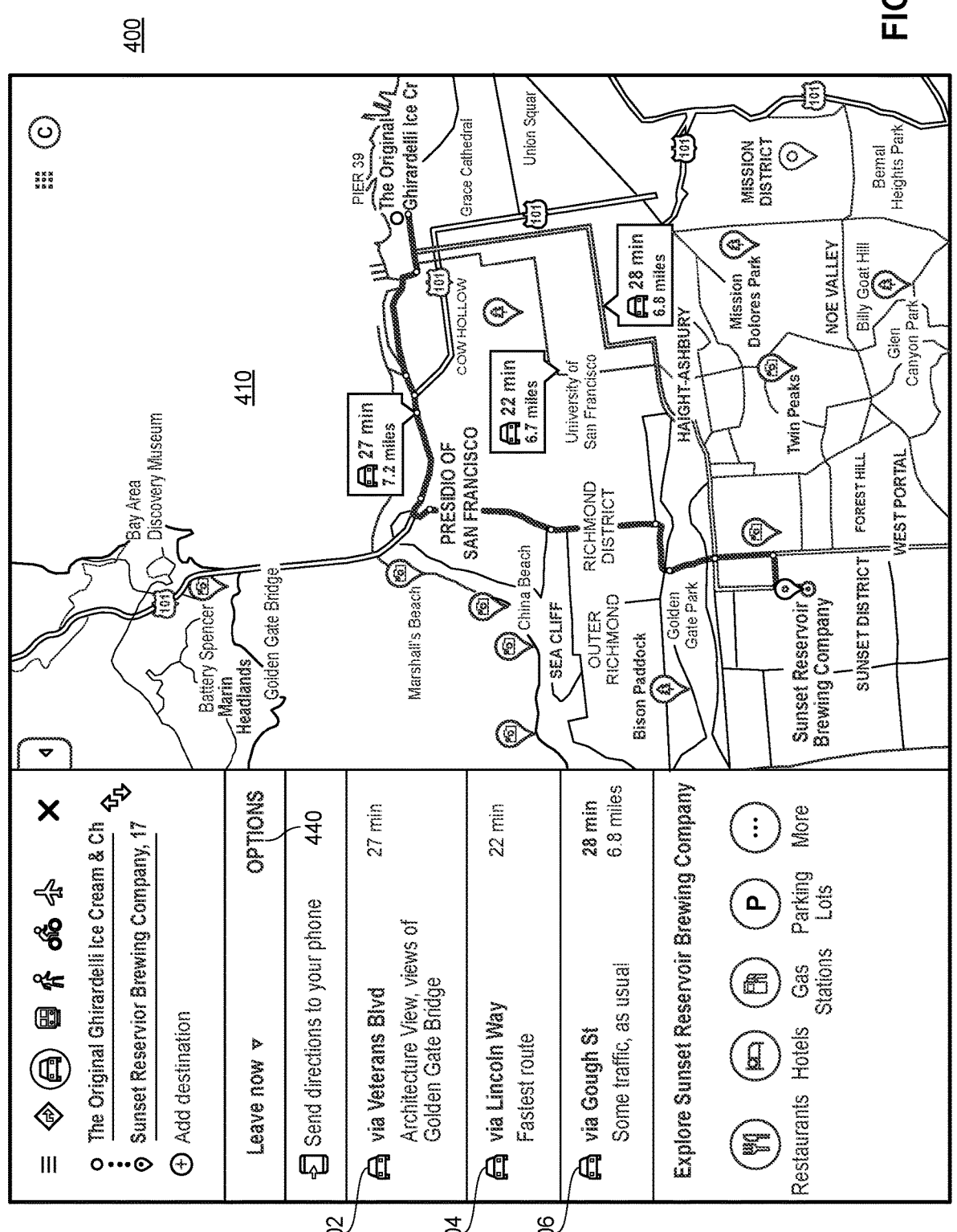
FIG. 4 illustrates an example navigation display indicating several routes from the starting location to the destination location for the user to select from which are presented in a ranked order.

FIG. 4 illustrates an example navigation display 400 which may be presented on the client device 12. The navigation display 400 indicates several routes 402-406 from the starting location to the destination location for the user to select from which are presented in a ranked order. For example, in response to a request for navigation directions from The Original Ghirardelli to Sunset Reservoir Brewing Company in San Francisco, the geographical feature scoring engine 68 may select a threshold number of routes (e.g., 3) from a set of candidate routes having the lowest combined weights, and may rank the threshold number of routes in order of combined weight, where the route having the lowest combined weight may be ranked the highest. Then the geographical feature scoring engine 68 may provide sets of navigation directions including indications of the selected routes to the map/navigation display module 44 to present on the navigation display 400. Each indication of a route 402-406 includes a description of the road segments along the route (e.g., via Veterans Blvd), an indication of the estimated time period for traversing the route, and/or a description of the route (e.g., "Architectural view, views of Golden Gate Bridge").

In the navigation display 400, the highest ranked route 402 does not have the shortest estimated time period for travelling from The Original Ghirardelli to Sunset Reservoir Brewing Company. Instead, the second highest ranked route 404 has the shortest estimated time period for travelling from The Original Ghirardelli to Sunset Reservoir Brewing Company but a lower categorical score for architecture than the highest ranked route 402, which has views of the Golden Gate Bridge from the route 402. Accordingly, the combined score/weight for the second highest ranked route 404 exceeds the combined score/weight for the highest ranked route 402 despite having a shorter estimated time period of traversal.

In response to the user selecting one of the indications of the routes 402-406 via a user control, such as touch-selecting or clicking on an indication of one of the routes 402-406, the navigation display 400 may present an indication of the selected route within the map view 410. For example, the navigation display 400 may highlight the selected route within the map view 410. In the example navigation display 400, the highest ranked route 402 is selected and highlighted in the map view 410. In addition to presenting user controls for entering a starting location and a destination location, the navigation display 400 may include a user control 440 for indicating a preference for the fastest route, the route with the shortest distance, the route having a view of a particular geographical feature type, etc.

In response to receiving a selection of the user control to select route options 440, the mapping application 14 may present a route options display, such as the route options menu 500 as shown in FIG. 5. The route options menu 500 may include user controls for selecting a preference for a particular type of geographical feature to view on a route to the destination. For example, the user may select a preference to view waterfalls on the route, mountains, bodies of water, greenery, caves, cliffs, architecture, churches, temples, monuments, etc. The route options menu 500 may also include user controls for selecting a particular geographical feature subtype. For example, the user may specify a preference to view rivers as a body of water ("water views") subtype. In another example, the user may specify a preference to view bridges as an architecture ("architectural views") subtype. In another scenario, the user may indicate a preference for architectural views which can include views of not only bridges but also buildings, homes, theatres, concert halls, opera houses, stadiums, aqueducts, castles, etc.

As described above, in addition to providing navigation directions from a starting location to a destination location, the mapping application 14 may include user controls for requesting a particular type of POI with a view of a particular geographical feature type, where the POI type is different from the geographical feature type.

Figure 6:
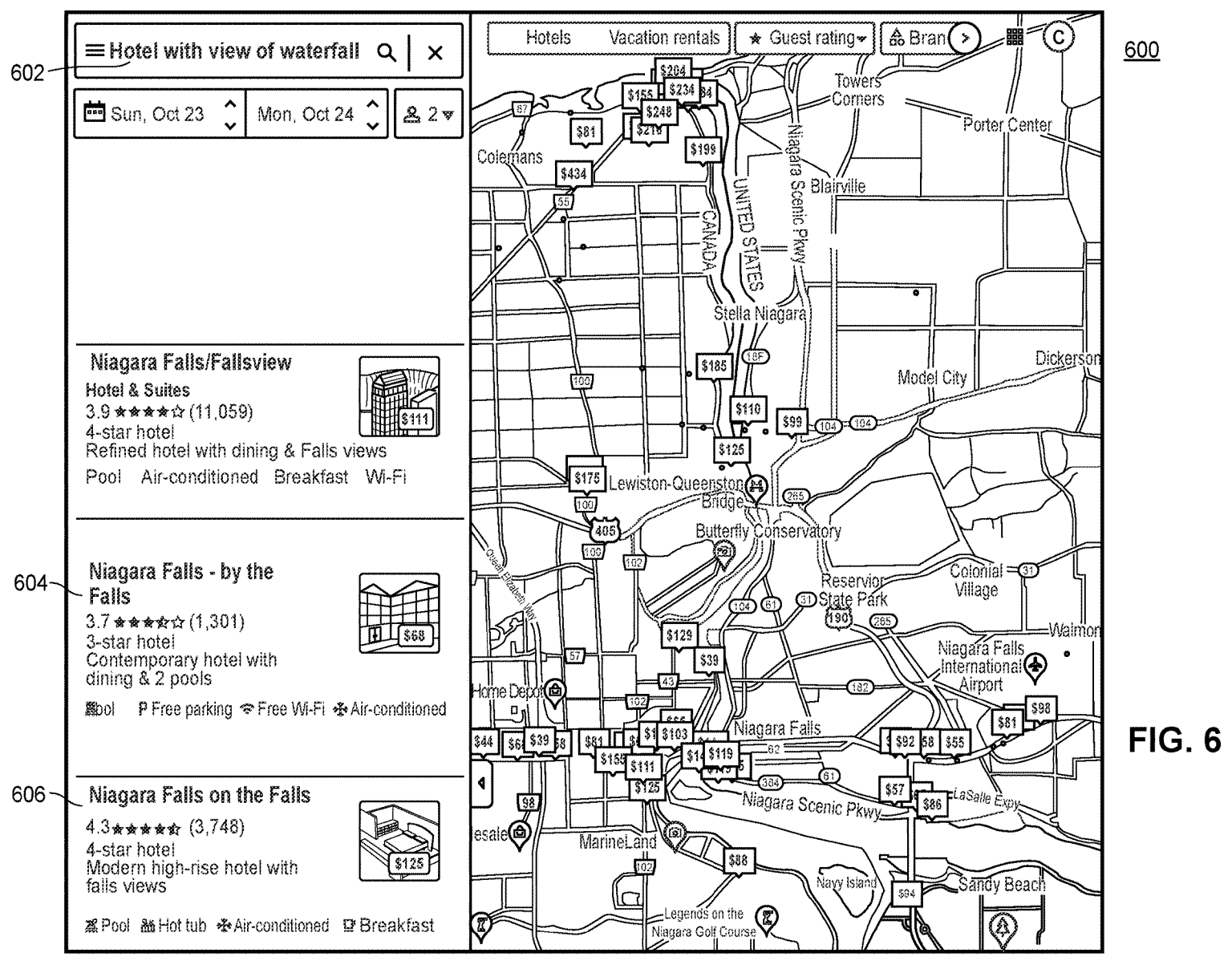

For example, the map/navigation display module 44 may present an example map display 600 as shown in FIG. 6. The example map display 600 includes a user control for providing a geographic search query that includes a request for a particular POI type with a view of a particular geographical feature type. For example, the geographic search query may be, "Hotel with view of waterfall." The geographic search query may specify a particular geographic area for the geographic search query. In other scenarios, the geographical feature scoring engine 68 may automatically select the geographic area based on the user's current location, the geographic area currently being presented within the map display 600, the user's search history, etc.

In any event, the geographical feature scoring engine 68 may obtain a set of candidate POIs corresponding to the requested POI type within the geographic area for example, from the map data server 20. For example, when the requested POI type is hotels and the geographic area is Niagara Falls, the geographical feature scoring engine 68 may obtain a set of hotels in Niagara Falls.

The geographical feature scoring engine 68 also assigns a categorical score for waterfalls to each of the candidate POIs for example, using the characteristics from the data table 250 as shown in FIG. 2B. The map display 600 indicates several POIs 602-606 for the user to select from which are presented in a ranked order. For example, the geographical feature scoring engine 68 may select a threshold number of POIs (e.g., 3) from the set of candidate POIs having the highest categorical scores. Then the geographical feature scoring engine 68 may provide indications of each POI 602-606 to the map/navigation display module 44 to present on the map display 600. In other implementations, the geographical feature scoring engine 68 may rank the candidate POIs based on any suitable combination of the categorical score for each POI, a price metric for each POI, a quality/review metric for each POI, etc. The geographical feature scoring engine 68 may then select a threshold number of POIs (e.g., 3) from the set of candidate POIs ranked above a threshold ranking.

In the map display 600, the highest ranked POI 602 is not the cheapest hotel or highest rated hotel according to reviews. Instead, the second highest ranked POI 604 is the cheapest, and the third highest ranked POI 606 is the highest rated hotel. However, the highest ranked POI 602 has a higher categorical score for waterfall views than the other POIs 604, 606.

Figure 7:
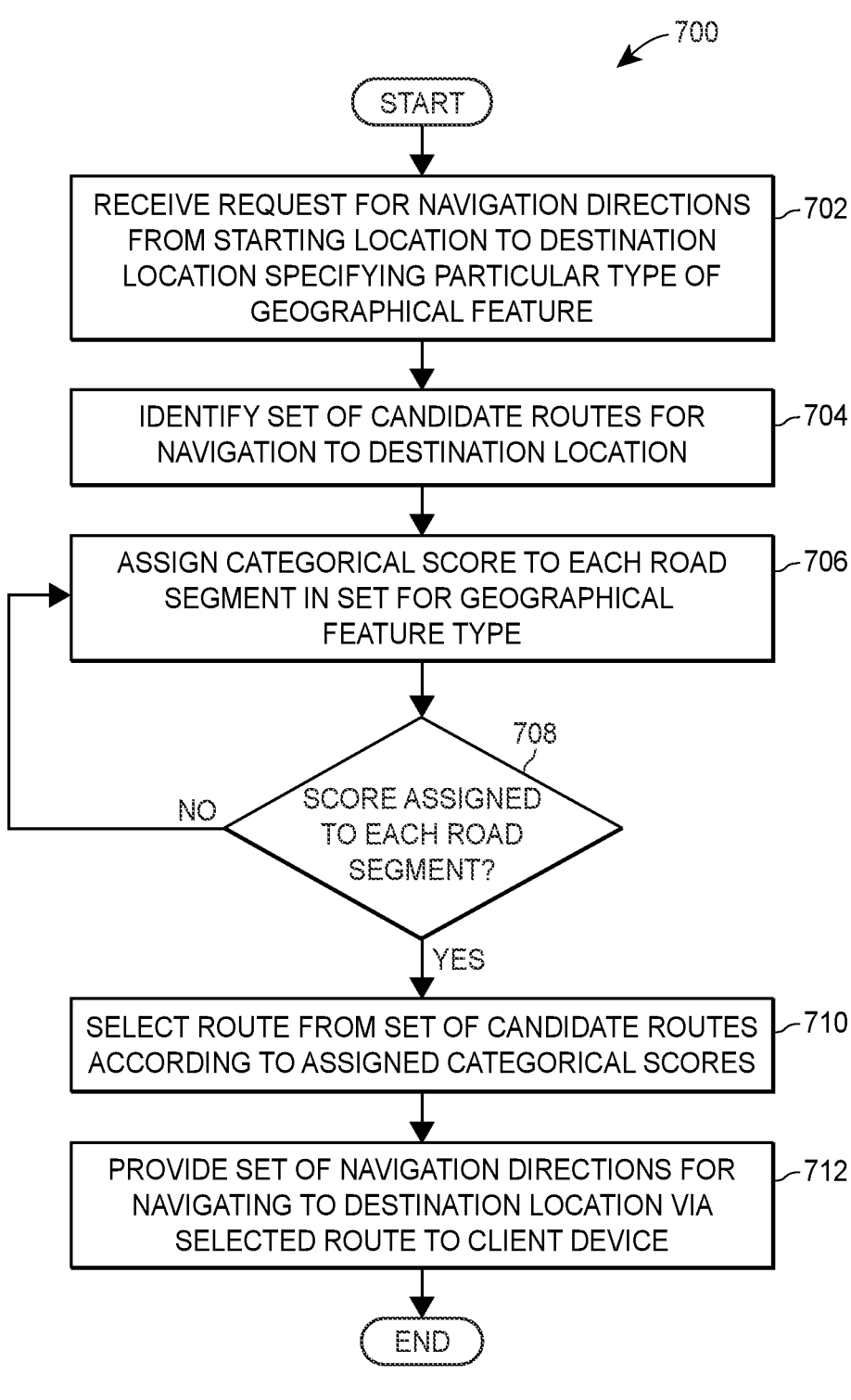
FIG. 7 is a flow diagram of an example method for providing navigation directions in response to a request for viewing a particular type of geographical feature on a route to a destination, which may be implemented in a server device.

FIG. 7 illustrates an example method 700 for providing navigation directions in response to a request for viewing a particular type of geographical feature on a route to a destination, which can be implemented at a network server (such as the server device 60), for example. The method can be implemented in a set of instructions stored on a computer-readable memory and executable at one or more processors of the server device 60. For example, the method can be implemented by the geographical feature scoring engine 68.

At block 702, the server device 60 receives a request for navigation directions from a starting location to a destination location. The request specifies a particular type of geographical feature to view on the route. For example, a user may provide the request via the client device 12 by selecting user controls on the navigation display 400 and the route options menu 500. The client device 12 may then transmit the request to the server device 60.

In response to the request, the server device 60 identifies a set of candidate routes for navigating from the starting location to the destination for example, from the navigation server 22 (block 704). Then the server device 60 assigns a categorical score corresponding to the requested geographical feature type for each road segment in the set of candidate routes (block 706). For example, for a road segment and a particular geographical feature type, the server device 60 may generate a distance metric, a visibility metric, a size metric, a count metric, a popularity metric, and a diversity metric for a landmark corresponding to the particular geographical feature type within the viewshed of the road segment. Then the server device 60 may combine the metrics in any suitable manner to generate a categorical score corresponding to the geographical feature type for the road segment.

Once a categorical score has been assigned to each road segment in the set of candidate routes (block 708), the server device 60 selects a route from the set of candidate routes according to the assigned categorical scores for the road segments on the candidate routes (block 710). For example, the server device 60 may assign an overall score or metric to each road segment based on the categorical score for the requested geographical feature type and/or the estimated time period for traversing the road segment. Then the server device 60 may select a route for navigating from the starting location to the destination location using a pathfinding algorithm, where each road segment is assigned a weight corresponding to the overall score for the road segment. More specifically, the server device 60 may select a route of the set of candidate routes having the lowest combined weight. Then the server device 60 provides a set of navigation directions for traveling to the destination via the selected route to the client device 12 (block 712).

In other implementations, the server device 60 assigns weights to the road segments corresponding to the categorical scores for the requested geographical feature type without factoring in the durations of each road segment. Then the server device 60 selects a route having the highest combined categorical score weight. The server device 60 also determines the estimated time period for traversing the selected route. The server device 60 compares the estimated time period for traversing the selected route to an estimated time period for traversing the fastest route to the destination. If the estimated time period for traversing the selected route exceeds the estimated time period for traversing the fastest route by more than a threshold duration (e.g., by more than 20%, by more than an hour, etc.), the server device 60 selects a different route which does not exceed the estimated time period for traversing the fastest route by more than the threshold duration. In other implementations, if the distance for traversing the selected route exceeds the distance for traversing the shortest route by more than a threshold distance (e.g., by more than 20%, by more than 10 miles, etc.), the geographical feature scoring engine 68 selects a different route having a distance which does not exceed the distance for traversing the shortest route by more than the threshold distance.

For example, the server device 60 may select the route having the next highest combined categorical score weight and continues to do so until a route is identified which does not exceed the estimated time period for traversing the fastest route by more than the threshold duration and/or does not exceed the distance for traversing the shortest route by more than the threshold distance.

In other implementations, the server device identifies a threshold number of routes (e.g., five) of the set of candidate routes having the lowest combined weights and/or having the highest categorical scores. Then the server device 60 provides the selected route(s) to the client device 12 for presentation in a ranked order according to the combined weights and/or categorical scores (block 712).

By virtue of the above process, the client device (user) is provided with a set of candidate routes ranked objectively based on criteria set by the user. Specifically, the candidate routes are ranked objectively based on the user-specified particular type of geographical feature, such that routes in which the particular type of geographical feature is most visible/prevalent on the route are ranked more highly than those in which the particular type of geographical feature is less visible or absent. As such, the method provides the user with a ranked set of routes that guarantee and maximize visibility of the user's desired particular type of geographical feature. The user is therefore able to select a route, using their client device, which guarantees a desired landscape.

The method may also take the duration of routes into account, thereby balancing the visibility and prevalence of the particular type of geographical feature with the duration of the route. As such, the user can select a route that guarantees visibility of the user's desired particular type of geographical feature, while minimizing the impact on the total route duration.

Figure 8:
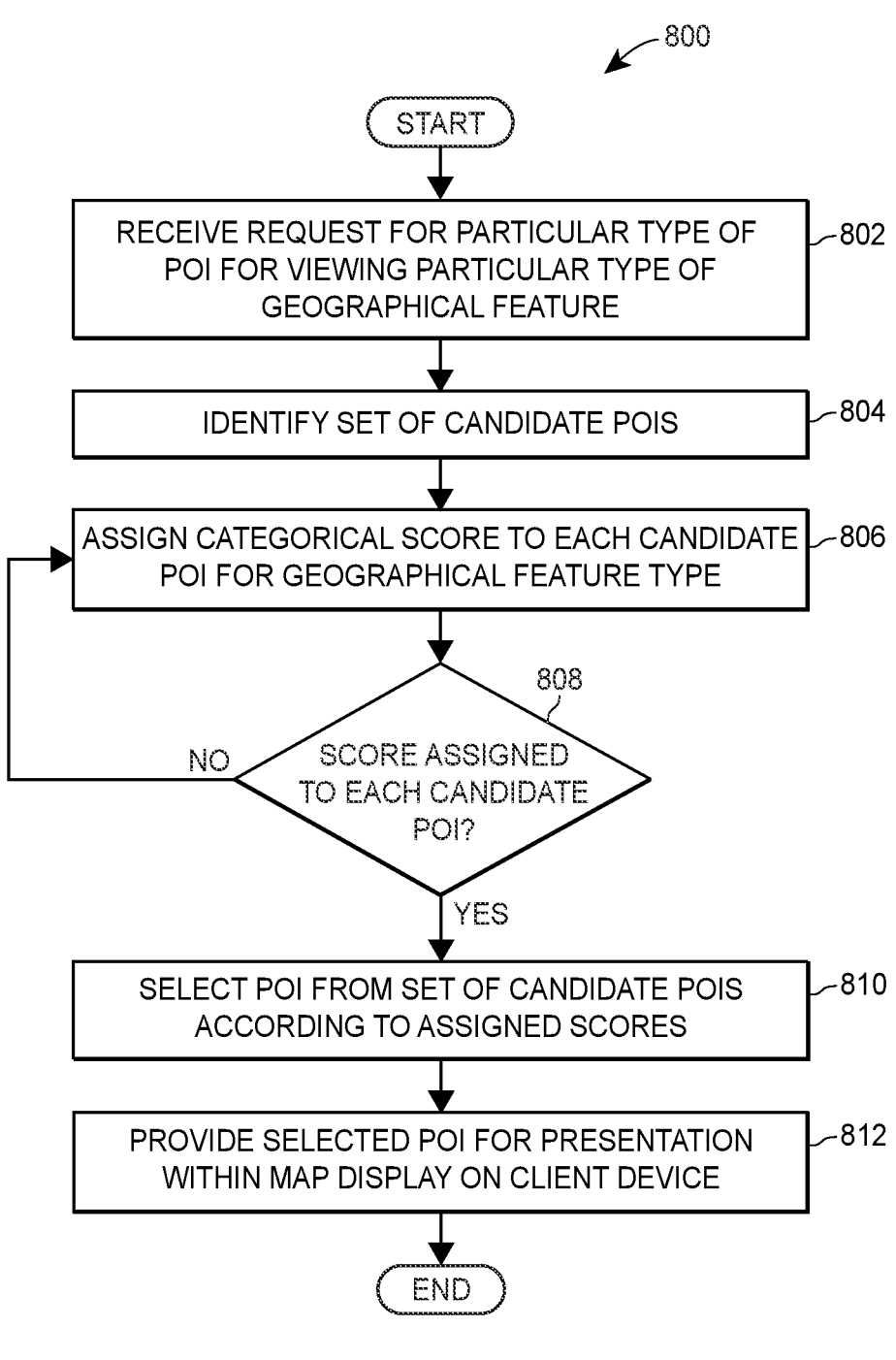
FIG. 8 is a flow diagram of an example method for providing a map display in response to a request for viewing a particular type of geographical feature, which may be implemented in a server device.

FIG. 8 illustrates an example method 800 for providing a map display in response to a request for viewing a particular type of geographical feature, which can be implemented at a network server (such as the server device 60), for example. The method can be implemented in a set of instructions stored on a computer-readable memory and executable at one or more processors of the server device 60. For example, the method can be implemented by the geographical feature scoring engine 68.

At block 802, the server device 60 receives a request for a particular type of POI for viewing a particular type of geographical feature. For example, the user may provide the request to the client device 12 by for example, entering a geographic search query into the map display 600, such as, "Hotel with view of waterfall." The client device 12 may then transmit the request to the server device 60.

At block 804, the server device 60 identifies a set of candidate POIs within a geographic area. The geographic search query may specify a particular geographic area for the geographic search query. In other scenarios, the server device 60 may automatically select the geographic area based on the user's current location, the geographic area currently being presented within the map display 600, the user's search history, etc. Then the server device 60 obtains a set of candidate POIs corresponding to the requested POI type within the geographic area for example, from the map data server 20.

Then at block 806, the server device 60 assigns a categorical score corresponding to the requested geographical feature type for each candidate POI. For example, for a POI and a particular geographical feature type, the server device 60 may generate a distance metric, a visibility metric, a size metric, a count metric, a popularity metric, and a diversity metric for a landmark corresponding to the particular geographical feature type within the viewshed of the POI. Then the server device 60 may combine the metrics in any suitable manner to generate a categorical score corresponding to the geographical feature type for the POI.

Once a categorical score has been assigned to each POI in the set of candidate POIs (block 808), the server device 60 selects a POI from the set of candidate POIs according to the assigned categorical scores (block 810). For example, the server device 60 may select the POI having the highest categorical score corresponding to the requested geographical feature type. In other implementations, the server device 60 may generate an overall score based on any suitable combination of the categorical score for each POI, a price metric for each POI, a quality/review metric for each POI, etc. Then the server device 60 may select the POI having the highest overall score.

Then the server device 60 provides an indication of the selected POI for presentation within a map display 600 on the client device 12 (block 812). In other implementations, the server device identifies a threshold number of POIs (e.g., five) of the set of candidate POIs having the having the highest categorical scores and/or having the highest overall scores. Then the server device 60 provides the selected POI(s) to the client device 12 for presentation in a ranked order according to the categorical scores and/or overall scores (block 812).

By virtue of the above process, the client device (user) is provided with a set of candidate POIs ranked objectively based on criteria set by the user. Specifically, the POIs are ranked objectively based on the user-specified particular type of geographical feature, such that POIs in which the particular type of geographical feature is most visible/prevalent are ranked more highly than those in which the particular type of geographical feature is less visible or absent. As such, the method provides the user with a ranked set of POIs that guarantee and maximize visibility of the user's desired particular type of geographical feature. The user is therefore able to select a POI, using their client device, which guarantees a desired landscape.

The method may also take the other metrics into account, such as price and/or quality, thereby balancing the visibility and prevalence of the particular type of geographical feature with the price and/or quality of the POI. As such, the user can select a POI that guarantees visibility of the user's desired particular type of geographical feature, while minimizing the impact on the price and/or quality of the POI.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing navigation directions or a map display in response to requests for viewing a particular type of geographical feature through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing navigation directions in response to a request for viewing a particular type of geographical feature on a route to a destination, the method comprising:

receiving, by one or more processors, a request for navigation directions from a starting location to a destination, the request specifying a particular type of geographical feature for viewing on a route to the destination;

identifying, by the one or more processors, at least one candidate route of a set of candidate routes for navigating from the starting location to the destination location that includes a road segment from which the particular type of geographical feature can be viewed;

assigning, by the one or more processors, a categorical score to each road segment in the set of candidate routes for the particular type of geographical feature, wherein the categorical score is based at least in part on a diversity metric indicative of diversity of the particular type of the geographical feature along the road segment and a visibility metric indicative of visibility of the particular type of the geographical feature from the road segment, wherein the visibility metric is generated by analyzing imagery from several photographs of street level viewpoints captured by one or more cameras stitched together to generate a three-dimensional rendering of real-world objects located within a geographical area on the route to the destination;

selecting, by the one or more processors, a route from the set of candidate routes based at least in part on the assigned categorical scores for each road segment; and providing, by the one or more processors, a set of navigation directions for presentation on a client device for navigating from the starting location to the destination location via the selected route.

2. The method of claim 1, wherein the categorical score for each road segment is determined for a landmark visible from the road segment having the particular type of geographical feature based on at least one of:

a distance metric indicative of a distance from the road segment to the landmark, a size metric indicative of a size of the landmark, a count metric indicative of a number of geographical features having the particular type of geographical feature at the landmark, or a popularity metric indicative of popularity of the landmark.

3. The method of claim 2, wherein the categorical score for each road segment is further based on weather conditions, a time of day, or time of year.

4. The method of claim 2, wherein the size metric is based on an elevation, surface area, height, width, length, or volume of the landmark.

5. The method of claim 2, wherein the diversity metric is based on a variation in sizes, shapes, types, or subtypes of the geographical features at the landmark.

6. The method of claim 1, further comprising:

assigning, by the one or more processors, a duration score to each road segment based on an estimated amount of time for traversing the road segment;

determining, by the one or more processors, an overall score for each road segment based on the duration score and the categorical score for the road segment; and selecting, by the one or more processors, the route using the overall scores for each road segment.

7. The method of claim 1, wherein selecting the route includes selecting, by the one or more processors, the route from the set of candidate routes that does not exceed a shortest duration or distance of the set of candidate routes by more than a threshold duration or distance.

8. A computing device for providing navigation directions in response to a request for viewing a particular type of geographical feature on a route to a destination, the computing device comprising:

one or more processors; and a non-transitory computer-readable memory coupled to the one or more processors and storing instructions thereon that, when executed by the one or more processors, cause the computing device to:

receive a request for navigation directions from a starting location to a destination, the request specifying a particular type of geographical feature for viewing on a route to the destination;

identify at least one candidate route of a set of candidate routes for navigating from the starting location to the destination location that includes a road segment from which the particular type of geographical feature can be viewed;

assign a categorical score to each road segment in the set of candidate routes for the particular type of geographical feature, wherein the categorical score is based at least in part on a diversity metric indicative of diversity of the particular type of the geographical feature along the road segment and a visibility metric indicative of visibility of the particular type of the geographical feature from the road segment, wherein the visibility metric is generated by analyzing imagery from several photographs of street level viewpoints captured by one or more cameras stitched together to generate a three-dimensional rendering of real-world objects located within a geographical area on the route to the destination;

select a route from the set of candidate routes based at least in part on the assigned categorical scores for each road segment; and provide a set of navigation directions for presentation on a client device for navigating from the starting location to the destination location via the selected route.

9. The computing device of claim 8, wherein the categorical score for each road segment is determined for a landmark visible from the road segment having the particular type of geographical feature based on at least one of:

a distance metric indicative of a distance from the road segment to the landmark, a size metric indicative of a size of the landmark, a count metric indicative of a number of geographical features having the particular type of geographical feature at the landmark, or a popularity metric indicative of popularity of the landmark.

10. The computing device of claim 9, wherein the categorical score for each road segment is further based on weather conditions, a time of day, or time of year.

11. The computing device of claim 9, wherein the size metric is based on an elevation, surface area, height, width, length, or volume of the landmark.

12. The computing device of claim 9, wherein the diversity metric is based on a variation in sizes, shapes, types, or subtypes of the geographical features at the landmark.

13. A method for providing a map display in response to a request for viewing a particular type of geographical feature, the method comprising:

receiving, by one or more processors, a request for a particular type of point of interest (POI) in a geographic area for viewing a particular type of geographical feature from the POI, wherein the particular type of POI is different from the particular type of geographical feature;

identifying, by the one or more processors, a set of candidate POIs in the geographic area;

assigning, by the one or more processors, a categorical score to each POI in the set of candidate POIs for the particular type of geographical feature, wherein the categorical score is based at least in part on a diversity metric indicative of diversity of the particular type of the geographical feature at the POI and a visibility metric indicative of visibility of the landmark from the POI wherein the visibility metric is generated by analyzing imagery from several photographs of street level viewpoints captured by one or more cameras stitched together to generate a three-dimensional rendering of real-world objects located within a geographical area on the route to the destination selecting, by the one or more processors, a POI from the set of candidate POIs using, for each POI in the set, the assigned categorical score and one or more of:

a distance metric indicative of a distance from the POI to a nearest landmark which can be viewed from the POI having the particular type of geographical feature, a visibility metric indicative of visibility of the landmark from the POI, a size metric indicative of a size of the landmark, a count metric indicative of a number of geographical features having the particular type of geographical feature at the landmark, or a popularity metric indicative of popularity of the landmark; and providing, by the one or more processors, an indication of the selected POI for presentation within a map display on a client device.

14. The method of claim 13, wherein the categorical score for each POI is further based on weather conditions, a time of day, or time of year.

15. The method of claim 13, wherein the size metric is based on an elevation, surface area, height, width, length, or volume of the landmark.

16. The method of claim 13, wherein the diversity metric is based on a variation in sizes, shapes, types, or subtypes of the geographical features at the landmark.

17. The method of claim 13, further comprising:

ranking, by the one or more processors, the set of candidate POIs based on the categorical score for each POI; and providing, by the one or more processors, the set of candidate POIs in a ranked order for presentation within the map display on the client device.

* * * * *